Sept. 20, 1955    H. A. GEERDS    2,718,411

FIFTH WHEEL MOUNTING ON SPACED SPHERICAL MEMBERS

Filed April 15, 1952

INVENTOR
HENRY A. GEERDS
BY
Frank E. Liverance, Jr.
ATTORNEY

United States Patent Office 2,718,411
Patented Sept. 20, 1955

2,718,411

FIFTH WHEEL MOUNTING ON SPACED SPHERICAL MEMBERS

Henry A. Geerds, Holland, Mich., assignor to Holland Hitch Company, Holland, Mich., a corporation of Michigan Application April 15, 1952, Serial No. 282,413

4 Claims. (Cl. 280—438)

This invention is concerned with a novel, practical, exceptionally economical fifth wheel structure and more particularly, with the mounting thereof, whereby the upper slotted plate of the fifth wheel may be rocked back and forth about a horizontal axis upon two spaced universal bearings, eliminating the previously used horizontal cross shaft and the stresses which have been engendered therein, when a trailer connected with the fifth wheel on a pulling truck or tractor is moving at high speed over roads around curves of many and different radii of curvature and up and down inclines of the road. With my invention, a cast steel fifth wheel plate, by novel structure, is mounted at two spaced apart joints, generally equal distances from and symmetrically located with respect to the central vertical plane of the plate, being carried upon mounting brackets fixedly secured to the chassis of a truck or tractor, said brackets having upwardly extending balls of spherical shape inserted into downwardly extending vertical sleeves integral with the fifth wheel plate. Said sleeves at their upper ends have semispherical recesses, with a radius of curvature approximating that of the exterior radius of curvature of the bracket balls; and after the spherical balls of the brackets are received in said sleeves, they are securely retained in place by wedges of a novel structure located below the horizontal plane of the centers of said spherical balls, and having surfaces complementary to the spherical surfaces of balls for bearing engagement thereof against said balls. Furthermore, said wedges carried by the downwardly extending ball receiving sleeves are provided with means for a micro-adjustment thereof, so that their bearing surfaces against said balls may be adjusted to take up wear and otherwise maintain the proper, best holding relationship of the wedges to said balls.

Further, with my invention lubrication of the balls with relation to the receiving sockets therefor in said sleeves is attained in a particularly practical and efficient manner. The fifth wheel mounted in accordance with the novel structure of my invention provides for a full rocking movement of the fifth wheel plate on the semi-spherical bearings of the upper portions of said balls against the complementary semi-spherical surfaces at the upper ends of the sleeve surrounded sockets at the lower side of the plate.

An understanding of the invention may be had from the following description, taken in connection with the accompanying drawing, in which.

Like reference characters refer to like parts in the different figures of the drawing.

Figure 1:
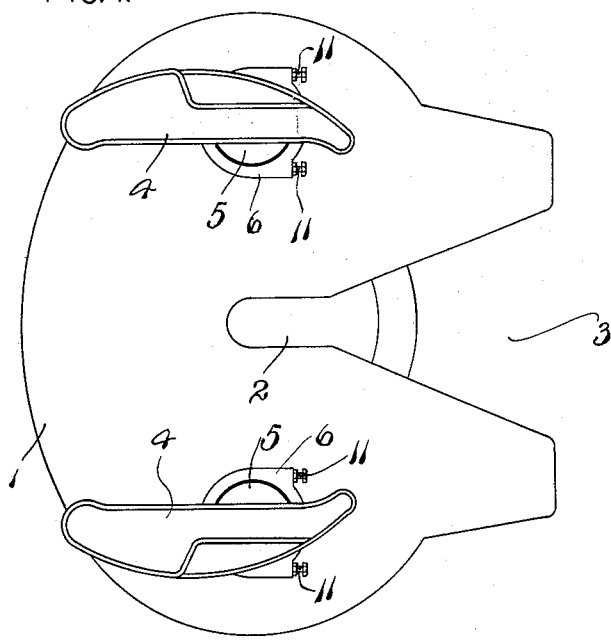
Fig. 1 is an under plan view of a fifth wheel showing the novel mounting of the plate thereof on spaced supporting brackets.
Figures 8, 9:
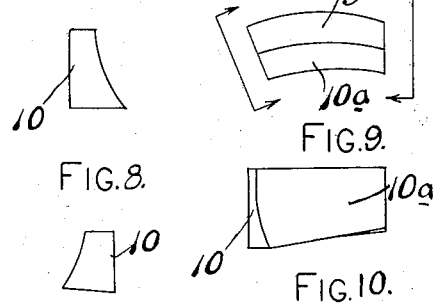
Fig. 8 shows opposite end elevations of the wedges, two of which are used.
Fig. 9 is a plan view of one of said wedges.
Figure 10:
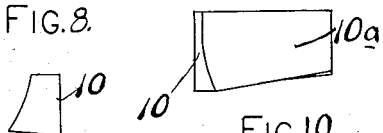
Fig. 10 is a perspective view thereof.
Figure 6:
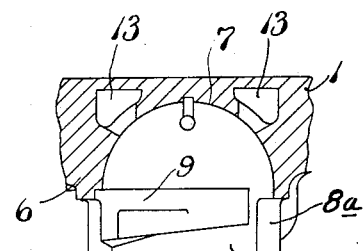
Fig. 6 is a similar central section, on the plane of line 6—6, through said socket structure, at right angles to the plane of line 5—5.
Figure 3:
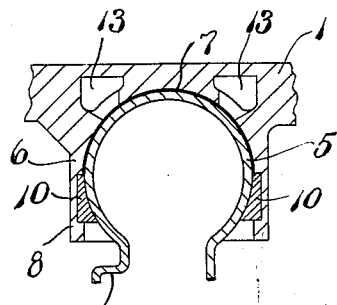
Fig. 3 is a fragmentary enlarged vertical section substantially on the plane of line 3—3 of Fig. 2, showing the retaining, holding or locking of the bracket balls in connection with the fifth wheel plate sockets.

The fifth wheel plate 1, of cast steel, is of conventional form, being slotted from its rear side to and a short distance beyond its central point, the inner portion of the slot at 2 having parallel sides, and the outer portion at 3, having sides rearwardly diverging from each other so that the outer end of said slot is of considerable width. Such structure of the fifth wheel plate is used in obtaining a connection between a downwardly extending pin secured at the under side and front portion of a trailer, which pin enters the wider portion 3 of the slot and is guided into the narrower slot 2 and then by old, well known and conventional structure releasably secured in place.

The fifth wheel plate is mounted upon two spaced brackets underneath it, each of which has a base 4, somewhat elongated, with a flat under side to bear against the upper sides of parts of a truck or tractor frame. Each bracket has an upwardly extending ball 5, of spherical form except at its under side where, through a connecting neck, it is connected at the base.

The brackets are secured to the truck or tractor frame at spaced distances from each other transversely of the tractor frame, and so located that downwardly extending sockets surrounded by generally cylindrical sleeves 6 cast integral with and at the under side of the plate 1 may receive the balls therein. The interior diameter of each sleeve 6 is approximately the same, though slightly larger, than the diameter of the ball 5. The upper end of the socket at 7 is of a semi-spherical shape, having a concave surface complementary to the convex surface of the upper half of a ball 5, and the radius of curvature of the semi-spherical concave surfaces 7 being a close approximation to the radius of curvature of the spherical ball 5.

Figure 5:
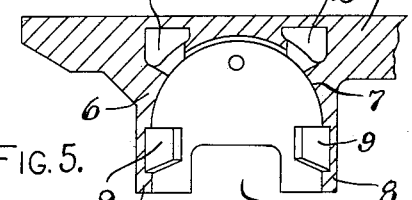
Fig. 5 is a central vertical section through said socket structure substantially on the plane of line 5—5 of Fig. 4.
Figure 7:
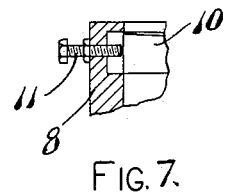
Fig. 7 is a fragmentary vertical section substantially on the plane of line 7—7 of Fig. 4, all sections being taken looking in the directions indicated by the arrows.
Figure 4:
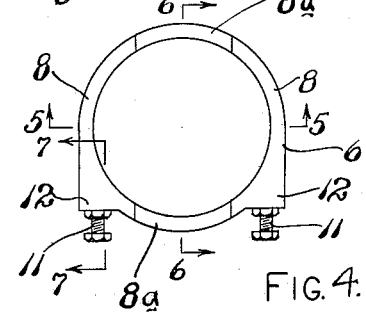
Fig. 4 is an under plan view of one of the sleeve surrounded sockets, two of which are cast integral with the plate.
Figure 2:
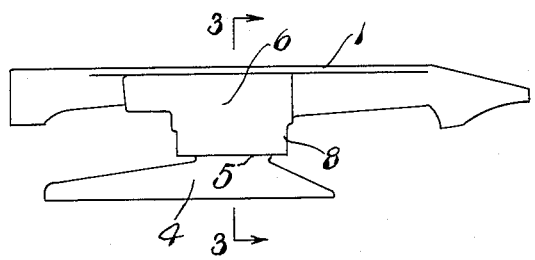
Fig. 2 is a side elevation of the fifth wheel plate mounted upon its bracket supports.

Each sleeve at its lower end, at the front and rear portions thereof, is notched out or recessed, as indicated at 8a, leaving two opposed downwardly extending skirt segments 8, best shown in Fig. 5. In each of these segments, at the inner sides thereof, ways 9 are machined or otherwise provided which at one end are open, reaching to the notch or recess 8a. After the plate 1 has been placed upon and located over the balls 5 holding or locking wedges 10 are inserted at the open ends of such slots. The inner sides of the wedges 10 have curved faces 10a conforming to the adjacent outer surfaces of the balls 5 with which they have bearing engagement below the horizontal plane of the centers of the balls. The ways 9, from their outer open ends toward their opposite ends, at their under sides are inclined upwardly. Upon the wedging members 10 being moved on the bearing tracks provided therefor by the under inclined sides of the slots 9, they will be moved upwardly and the surfaces 10a thereof brought closer to the adjacent surfaces of the balls 5. The adjustment thus made is one of a micro nature being measured in thousandths of an inch and can be taken care of very easily and yet secure an exceptionally accurate adjustment. The adjustment is controlled by adjusting screws 11, threaded through enlarged or shoulder portions 12 on the depending skirt portions 8 on the sleeves 6 which being sufficiently withdrawn when the wedges are entered, may thereafter be threaded inwardly for the screws come against larger outer ends of the wedges. When said screws 11 have been properly adjusted to locate the wedges 10 in the best position with respect to the balls 5 with which they engage, the screws may be locked in position by the usual lock nuts shown.

The plate 1 at the upper portions of the ball receiving sockets preferably will be cored so that, when cast, lubricant holding chambers 13 are provided from which passages may lead to the semi-spherical surface 7 of the sockets, thus supplying lubricant between said surfaces 7 and the inner sides of the wedges 10 and of the outer surfaces of the balls 5 with which they have bearing engagement.

There are numerous advantages following from the novel structure which has been described. Larger bearing surfaces are provided in connection with the same metal content or weight of metal which is used to make the fifth wheel. The use of a cross shaft is eliminated. The structure is simplified as there is a reduction in the number of parts. The machining and other finishing of the fifth wheel is more economical because of less finishing needed. The fifth wheel has a longer life of service and is less costly to make. Compared with a normal fifth wheel structure as now produced, a saving of forty pounds of steel and other metals is attained. The fifth wheel is assembled and installed on the frame of a truck with greater ease as the brackets are self-positioning in all directions and cannot set up a bind in the bearings even though distortion of the truck or tractor frame occurs. Wear of the surfaces of either the ball or socket which may come from rocking action of the fifth wheel plate is quickly and easily taken up by operating the adjusting screws 11 and their lock nuts to force the wedges upwardly on the inclined bearing tracks therefor, to desired contact with spherical surfaces at the lower portions of the balls. The large reservoir of lubricant which may be provided insures long life and smooth operation in service when subjected to load.

The invention is defined in the appended claims and is to be considered comprehensive of all forms of structure coming within their scope.

I claim:

1. A fifth wheel plate having two spaced, integral, downwardly extending sleeves of cylindrical form open at their lower ends, the under side of the plate at the upper ends of and within the sleeves having semi-spherical recesses of the same radius as the inner radius of said sleeves, a spherical support freely entering the lower end of each of said sleeves, each sleeve at its lower portion, interiorly and at diametrically opposite positions therein having generally horizontal key receiving ways, and an elongated key in each way having an inner side shaped with a radius of curvature equal to the radius of curvature of the recesses in the plate.

2. A fifth wheel plate having two transversely spaced cylindrical sleeves, open at their lower ends, extending vertically downward therefrom, the plate at its lower side and at the upper end of and within each sleeve having a semi-spherical recess having a radius of curvature the same as the inner radius of its sleeve, each of said sleeves, below the center of curvature of its associated upper end recess having an elongated key way within and at each of opposite sides of each sleeve, and an elongated key in each way, each having an inner side of curved form on a radius of curvature equal to that of the associated recess, said curved side of each key being flush with and a downward continuation of the inner curved sides of said recess.

3. Structure as defined in claim 2, the lower side of each key way inclining upwardly from one end to the other, and each key having a complementary lower side to bear against said lower side of its associated key way, and individual means mounted on each sleeve, one for each key, engaging against each of the keys for adjusting each key lengthwise of its key way.

4. Structure as defined in claim 3, said adjusting means for each key comprising a screw threaded through the sleeve carrying the keys, one for each key, and bearing against an end of a corresponding key to move it longitudinally up its inclined key way.

UNITED STATES PATENTS

References Cited in the file of this patent

| | | |
|---|---|---|
| 1,073,264 | Mayer et al. | Sept. 16, 1913 |
| 1,545,180 | Alley | July 7, 1925 |
| 1,835,160 | Hufferd | Dec. 8, 1931 |
| 1,844,340 | Sneed | Feb. 9, 1932 |
| 1,968,623 | Swift | July 31, 1934 |
| 1,986,149 | Harris | Jan. 1, 1935 |
| 2,196,537 | Sherman | Apr. 9, 1940 |
| 2,289,079 | Seyferth | July 7, 1942 |
| 2,539,186 | French | Jan. 23, 1951 |
| 2,618,488 | Ketel | Nov. 18, 1952 |